Figure 14:
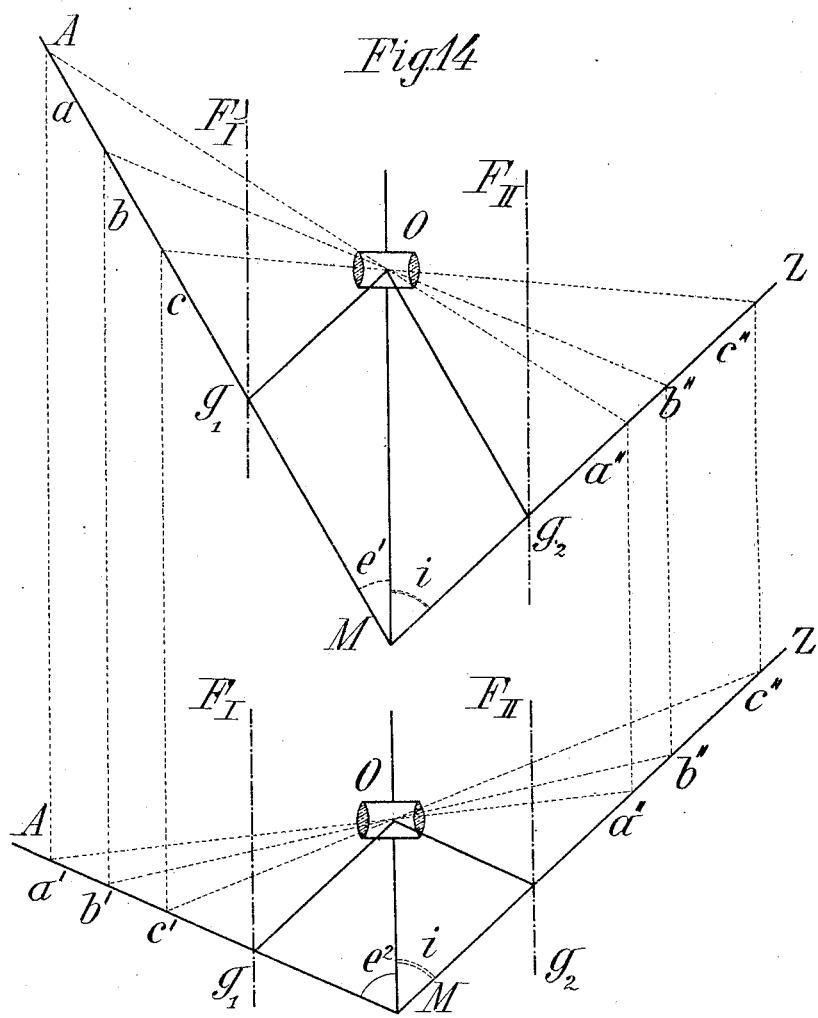

No. 751,347. PATENTED FEB. 2, 1904.
T. SCHEIMPFLUG.
METHOD OF DISTORTING PLANE IMAGES BY MEANS OF LENSES OR MIRRORS.
APPLICATION FILED MAR. 31, 1903.
NO MODEL. 5 SHEETS—SHEET 1.
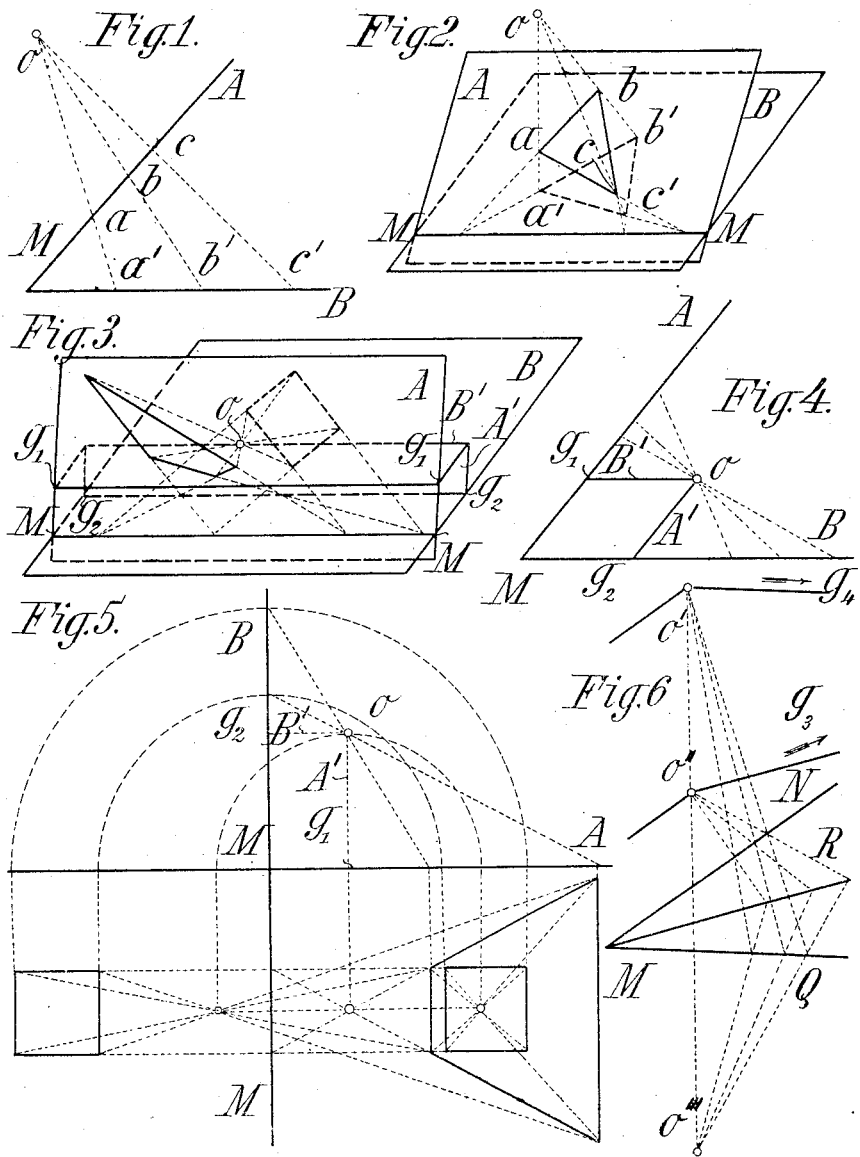

No. 751,347. PATENTED FEB. 2, 1904.
T. SCHEIMPFLUG.
METHOD OF DISTORTING PLANE IMAGES BY MEANS OF LENSES OR MIRRORS.
APPLICATION FILED MAR. 31, 1903.
NO MODEL. 5 SHEETS—SHEET 2.
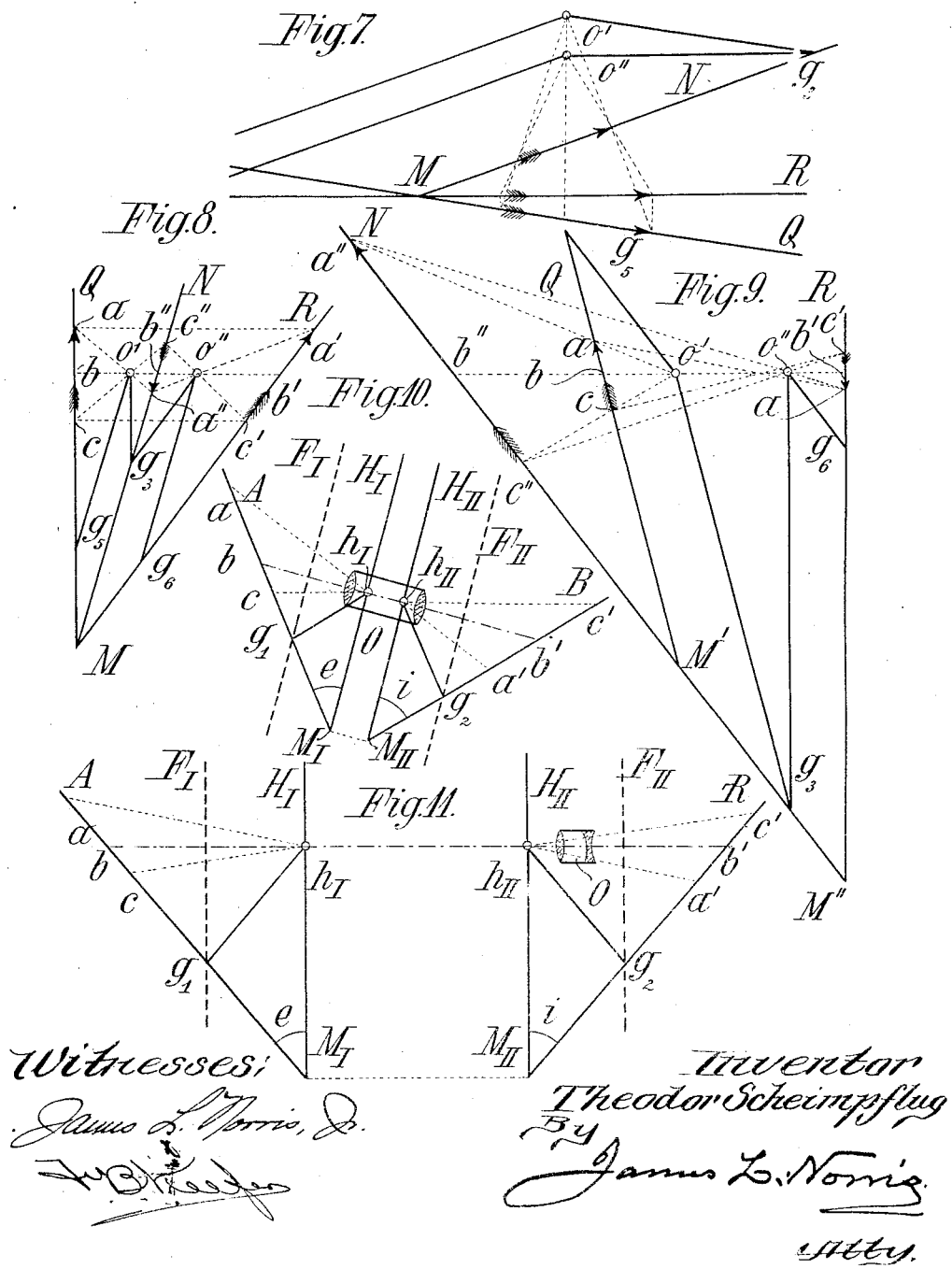

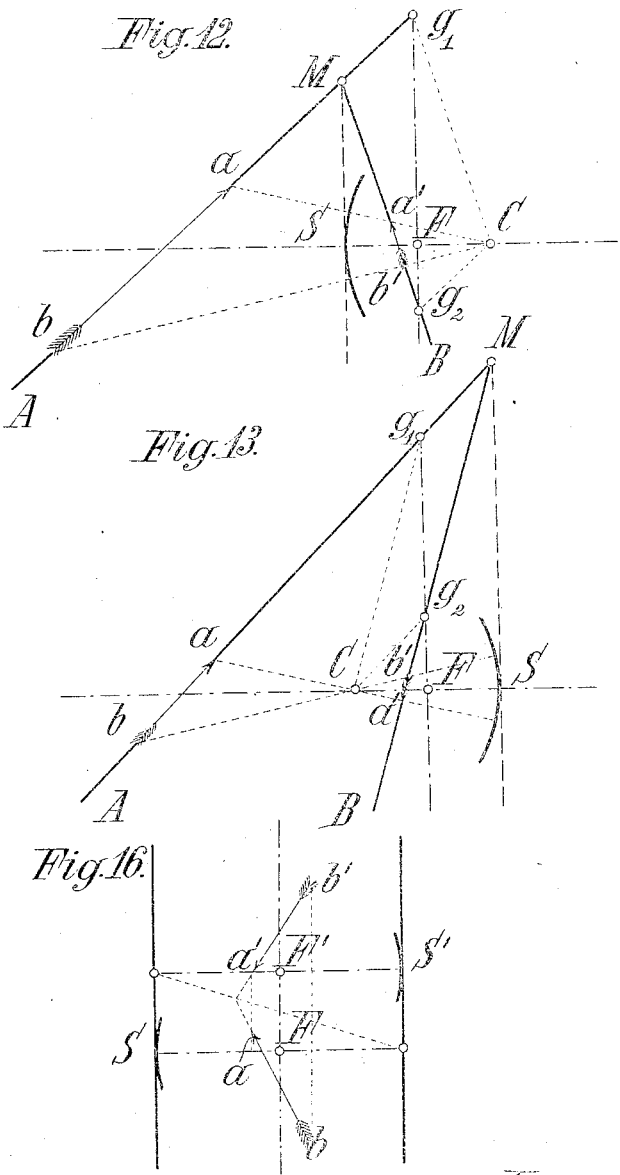

No. 751,347. PATENTED FEB. 2, 1904.
T. SCHEIMPFLUG.
METHOD OF DISTORTING PLANE IMAGES BY MEANS OF LENSES OR MIRRORS.
APPLICATION FILED MAR. 31, 1903.
NO MODEL. 5 SHEETS—SHEET 5.

No. 751,347.

Patented February 2, 1904.

UNITED STATES PATENT OFFICE.

THEODOR SCHEIMPFLUG, OF VIENNA, AUSTRIA-HUNGARY.

METHOD OF DISTORTING PLANE IMAGES BY MEANS OF LENSES OR MIRRORS.

SPECIFICATION forming part of Letters Patent No. 751,347, dated February 2, 1904.

Application filed March 31, 1903. Serial No. 150,489. (No model.)

*To all whom it may concern:*

Be it known that I, THEODOR SCHEIMPFLUG, a subject of the Emperor of Austria-Hungary, residing at Vienna, in the Province of Lower Austria, in the Empire of Austria-Hungary, have invented certain new and useful Improvements in Methods of Distorting Plane Images by Means of Lenses or Mirrors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

It is well known in the practice of photography that in reproductions slight alterations of the original picture can be readily effected without affecting the clearness of definition of the photographic picture by slightly inclining the original picture and the receiving-plate relatively to the objective. Reproducing apparatus are also known which allow of utilizing this circumstance; but this alteration of the original picture has hitherto been done solely in an empirical manner and it is a very tedious and troublesome operation, which can be carried out only within very narrow limits and with a comparatively small degree of accuracy. For this reason it has often been preferred to attempt to obtain the alteration of the original picture without reference to the clearness of definition of the photographic picture, and to obtain the requisite clearness of definition of the photographic picture by the use of very small screens and strong light; but, on the other hand, it is a matter both of scientific as well as of commercial interest to be able to carry out such alterations of the original picture in an exact and systematic manner; and the present invention has for its object to provide a method based on exact and mathematical principles of solving this problem.

For the purpose of enabling the nature of this invention to be clearly understood it will be necessary, first, to set forth those principles of geometry of position and of optics which are employed here before describing the method itself.

Figure 15:
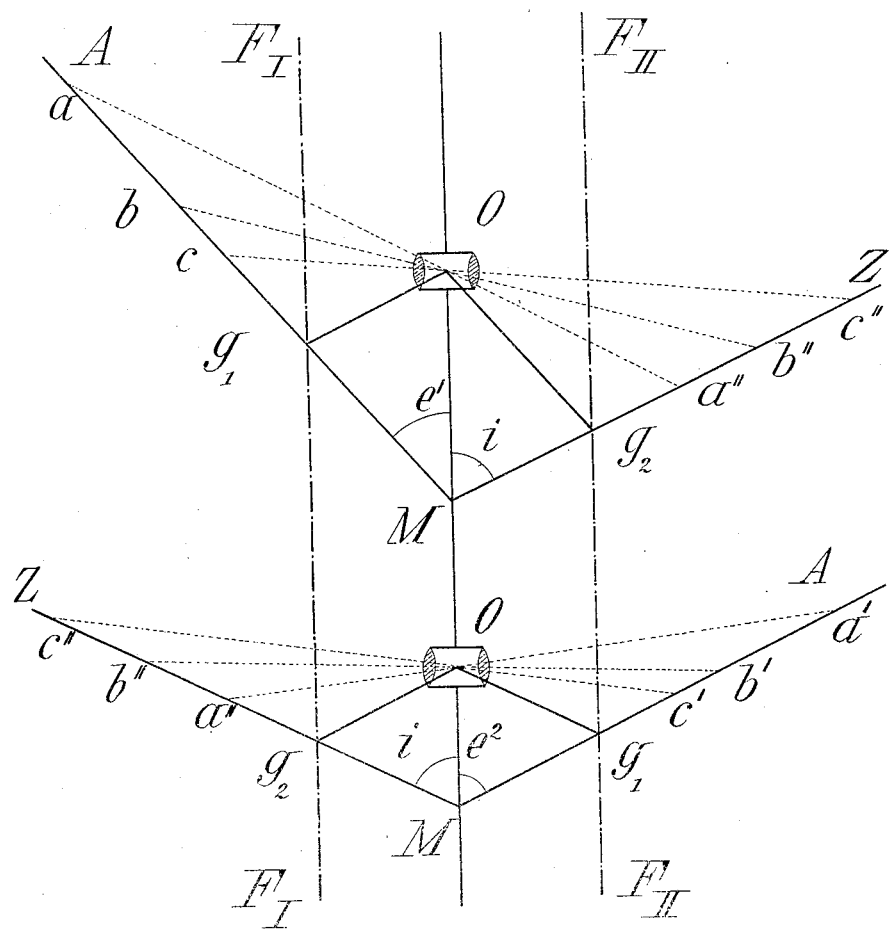

In the accompanying drawings, Figures 1 and 2 are respectively a section and a perspective view illustrating the meaning of the terms "projective" and "perspective," "axis of collineation," and "axis of projection." Figs. 3 and 4 illustrate in perspective view and in section the meaning of the terms "counter-plane" and "counter-axis," and the consequent geometrical relations of the two collinear pictures to each other. Fig. 5 illustrates the path which is described by the center of projection when one picture is rotated around the axis of collineation relatively to the other picture. Fig. 6 illustrates the mutual perspective relations of several projective images, the planes of which intersect one another in the same straight line. Figs. 7, 8, and 9 illustrate the condition of affinity—that is to say, Fig. 7 illustrates the case in which all the images remain upright, Fig. 8 illustrates the case in which there is first an inversion of the image and then the image is reërected, and Fig. 9 illustrates the case in which first an erect image is produced, which is then inverted, and vice versa. Figs. 10 and 11 illustrate the optical conditions for the production of images in planes inclined to the optical axis with the use of spherical lenses and the connection between the geometrical relations and the optical relations of the picture and its image thus produced, said connection constituting the basis of the improved method. Fig. 10 illustrates the case of the use of a symmetrical objective, the distance between the two principal planes being shown exaggerated for the sake of clearness. Fig. 11 illustrates the case of an unsymmetrical objective, and more particularly of a tele-objective, where the distance between the two principal planes can no longer be neglected. Figs. 12 and 13 illustrate the laws of the production of images when spherical mirrors are employed. Figs. 14 and 15 illustrate the procedure which forms the basis of the improved method for the production of affinite pictures by optical means— that is to say, Fig. 14 illustrates the case where the positions of the original and of the photographic picture are convertible, and Fig. 15 illustrates a case where the original can be inserted on one side only. Fig. 16 illustrates a way of carrying out the improved method for the purpose of direct producing affinite alterations of the original picture.

In accordance with the newer geometry or geometry of position two plane figures *a b c* and *a' b' c'*, Figs. 1 and 2, which have been produced by the intersection of the same bundle of rays by two planes A and B, are described as being "projective" or "collinear" to each other, and every relative position of those planes in which all the straight lines connecting two points $a\ a'$, $b\ b'$, $c\ c'$ of the respective planes meet in one point $o$ is called a "perspective" position. The point $o$, from which these connecting straight lines (lines of sight) diverge, is called the "center of projection or of collineation," and the straight line of intersection M M of the two planes A and B, which is common to the two figures under consideration, is called the "axis of collineation." Since the axis of collineation is common to the two figures, every straight line of the original will intersect its image in a point in the axis of collineation, and vice versa. Again, the planes A' and B', Figs. 3 and 4, drawn through the center of projection $o$ parallel to the two planes A and B, are called "counter-planes," and they intersect the planes of the pictures in the images of the infinitely distant straight lines of the planes B and A. These lines $g'$ and $g^2$ are called "counter-axes" and are the geometrical *loci* of the points of intersection of all the mutually-intersecting straight lines which appear as parallel straight lines in the plane of the other picture—that is to say, the counter-axis $g'$, situated in the plane A, is the geometrical *locus* of the points of intersection of all the straight lines which appear as parallel straight lines in the plane B, and vice versa. Further, these counter-axes have also the important function of axes of rotation for the center of collineation when one of the two planes A or B is rotated about the axis of collineation—that is to say, if the plane B be rotated about the axis of collineation M M the center of collineation $o$ will describe a circle in a plane perpendicular to the axis of collineation and with its center situated in the counter-axis $g'$, Fig. 5. If the plane A be rotated on the axis M, the center of projection will describe an analogous circle having its center situated in the counter-axis $g^2$. A projective relation between an original and its image—that is to say, the possibility of bringing the two in perspective dependence on each other—exists always in those cases where every point of, say, the image is desired to correspond to a single point, and, similarly, every straight line is desired to correspond to a single straight line of the original. Consequently all cases are excluded in which there are duplications or multiplications or even a disappearance of single elements or where straight lines are required to be altered to curved lines, or vice versa. An affinite alteration of an original—that is to say, an alteration such that the image is lengthened or shortened in a determined direction, but remains completely unaltered in another direction—would be possible in a direct manner, such as by the incidence of shadow, only when the center of projection is situated at an infinite distance—that is to say, plane pictures on the same scale which have an affinite relationship to one another may first be conceived as figures of intersection of two planes with one and the same cylinder of rays; but the geometry of position teaches that yet another conception is possible. If, according to Fig. 6, a plane picture in the plane M N be projected from the point $o'$ onto the plane M Q and also from the point $o''$ onto the plane M R and the three planes M N, M Q, and M R insersect one another in one and the same straight line M M, which is the common axis of collineation of the three pictures, then the two images projected on the planes M Q and M R will be situated in perspective to each other, and their common center of collineation $o'''$ will be situated in the straight line $o'\ o''$. This new center of collineation $o'''$ may, however, be also situated at an infinite distance. When this is the case, the pictures on M Q and M R are in affinite relationship to each other, Fig. 7. Affinity is merely a particular case of projection. However, notwithstanding this fact, with the object of avoiding circumlocutions the term "projective" will hereinafter be employed as opposed to "affinite" in the sense that the geometrical relations which are being considered herein will always be termed "projective" when the center of projection $o'''$ is situated at a finite distance and will be termed "affinite" when the center of projection $o'''$ is situated at an infinite distance. If, Fig. 6, a plane be drawn through the center of projection $o'$ parallel to the plane of the image on M Q and a plane be drawn through the center of projection $o''$ parallel to the plane of the image on M R, these planes will intersect, as above stated, the plane of the common image on M N in the counter-axes $g^3$ and $g^4$, which are situated in this figure outside of the surface of the drawing. So long as the two images on M Q and M R are projective—that is to say, their common center of projection $o'''$ is situated at a finite distance, Fig. 6—these two counter-axes in the plane M N will remain parallel, but separate. If the center of projection $o'''$ be shifted to an infinite distance, so that thus the relation of the images to each other becomes affinite, then these two counter-axes $g^3\ g^4$ will coincide with one and the same straight line $g^3$, Figs. 7, 8, and 9. From this follows the important practical rule for the purpose of this invention. When two projectively-altered images are to complement each other, so as to form an affinitely-altered image, the two projectively-altered images must possess in common not only the intermediate image, but also the counter-axis belonging to the intermediate image. Of importance is, further, the direction of affinity—that is to say, the direction of the generatrix of the cylinder of rays which produces the affinity is determined by the straight line connecting $o'$ and $o''$. The greatest possible efficiency is obtained in affinite alterations of an original when either the original or the image is perpendicular to the direction of the affinity rays.

In Figs. 8 and 9 the counter-axes situated in the planes Q and R are indicated by the reference-letters $g^5$ and $g^6$.

For the present invention the most important deduction from optics is the following: Every spherical lens and, in fact, every system of lenses combined in any way whatever has two points, (nodal points,) which are of course merely mathematical fictions and have nothing to do with the actual course of the rays, but are of the greatest importance for the mathematical treatment of optical problems. These nodal points correspond to each other mutually as an object and its image and have the property, which is extremely important for the perspective relations of the images produced, that they constitute the centers of projection of these images in a strictly mathematical sense. From this it follows, first, that photographic objectives may be employed in the place of centers of projection and as such act strictly as geometrical points; second, but that the center of projection of the perspective systems considered hitherto is resolved into a double point when systems of lenses are used for producing images, and the perspective system is resolved into two half systems, which must be considered and treated separately. If, with reference to Fig. 10, the planes $H_I H_{II}$, which are drawn through the two nodal points $h_I h_{II}$ perpendicularly to the optical axis, be called "principal" planes, then the first half system will be composed of the plane A of the original $a\ b\ c$, the first main plane $H_I$ of the system of lenses, and the first nodal point $h_{II}$ as a center of projection and also of the first counter-plane $h_I g$, which is drawn through the first nodal point $h_I$, parallel to the second plane $B_I$ of the image, and intersects the first plane A of the original in the first counter-axis $g'$, which latter must always be situated in the first focal plane F of the objective when clearness of definition of the image is desired. The second half system is composed of the second principal plane $H_{II}$, the plane B of the projected image $a'\ b'\ b'$, the second nodal point $h_{II}$ as the center of projection and of the second counter-plane $h_{II}, g^2$, which is drawn through the second nodal point $h_{II}$, parallel to the first plane A of the original, and intersects the second plane B of the image in the second counter-axis $g^2$, which latter must always be situated in the second focal plane $F_{II}$ of the objective when clearness of definition of the image is required.

The general lens equation $\frac{1}{a} + \frac{1}{b} = \frac{1}{F}$, as also the geometrical constructions usually employed in optics for determining the relations between the image and the object, should for accurate work always be referred to the principal planes or the nodal points. It must, however, be borne in mind that the two nodal points, and therefore also the principal planes in most of the systems of lenses occurring in practice by reason of being symmetrical as a rule, lie so close to each other that they may practically be considered as coincident with each other. In such cases the expressions "optical center" and "plane of the objective" are employed; but the tele systems or the combinations of positive and negative lenses by reason of their great want of symmetry form important exceptions to this rule, and in these cases the nodal points or the principal planes lie far outside of the system of lenses—namely, on the side of the positive lens—while the two nodal points or principal planes are shifted at the same time far apart, Fig. 11. This also holds good in the case of spherical mirrors, (concave and convex mirrors,) Figs. 12 and 13. In these mirrors the center of curvature C fills the function of the center of projection or of the nodal points, the vertex plan S fills the function of the principal planes; but then the perspective system appertaining to the mirror remains a simple one as compared with the perspective system appertaining to lens.

The following tabular statement reproduces in a concise manner the hereinbefore-discussed relations between geometric and optical ideas in the projective production of images by means of an optical system:

| Perspective. | Spherical lenses. | Spherical mirrors. |
|---|---|---|
| One center of projection $o$. | Two nodal points $h_I h_{II}$. | One center of curvature C. |
| Two planes of projection A B. | Two planes of images A B. | Two planes of images A B. |
| One axis of collineation M. | Two intersecting straight lines $M_I M_{II}$ between the two principal planes and planes of the images, (called "axes of distortion.") | One intersecting straight line M between the two planes of the images and the vertex plane S of the mirror, (called "axis of distortion.") |
| Two counter-planes $o\ g'\ o\ g^2$. | | |
| | Two focal planes $F_I F_{II}$. | One focal plane F. |
| | Two principal planes $H_I H_{II}$. | One vertex plane S' |
| Two counter-axes $g'\ g^2$ as straight lines of intersection of the planes of projection with the counter-planes. | Two counter-axes $g'\ g^2$ as straight lines of intersection of each plane of the image with the appertenant focal plane. | Two counter-axes $g'\ g^2$ as straight lines of intersection of the two planes of the images with the one focal plane. |

The theoretical basis of the method constituting the present invention will now be set forth in a narrower sense. As a rule the laws of optics are applied only to images the planes of which are perpendicular to the optical axis of the lenses or mirrors employed. The question as to what kind of laws obtain when the planes of the images are inclined to the optical axis has not been treated hitherto mathematically or considered in practice; but this question is of particular importance for the present method, and the study thereof has yielded the following results:

I. In the case of lenses—

First. Every plane image is reproduced as a plane image by any desired combination of systems of spherical lenses.

Second. The plane of the original and the first principal plane of the system of lenses, as also the plane of the projected image and the second principal plane of the system of lenses, intersect one another in optically-conjugate straight lines—that is to say, these straight lines of intersection $M_I M_{II}$, Figs. 10 and 11, which are situated in the principal planes, correspond to each other as object and image. In a geometrical sense they fill, as regards the images, the functions of the axes of collineation of the two perspective half systems. If the two nodal points combine to form the optical center $o$, and thereby the two principal planes to the objective plane M O, then the two planes of the original and its image and the objective plane will intersect one another in the same straight line M M, which takes over the function of the geometrical axis of collineation of the two pictures.

Third. The general lens equation assumes the form:

$$+\frac{1}{F} = \frac{1}{R \tan. e} + \frac{1}{R \tan. i}$$

in which $$R = M_I h_I = M_{II} h_{II},$$

$e$ and $i$ being the angles which are inclosed by the planes of the pictures with the two principal planes or with the objective plane, and F is the focal length of the objective, while $+\frac{1}{F}$ is inserted for a condensing-lens and $-\frac{1}{F}$ for a dispersing-lens.

Fourth. This general lens equation has an important geometrical meaning—namely, if the counter-axes of the two perspective half systems are determined by drawing planes through the two nodal points $h_I$ and $h_{II}$ parallel to the two planes A and B and causing them to intersect the said two planes then these counter-axes will always be situated in the focal planes of the lens system. Consequently the counter-axes have an optical meaning as well as a geometrical signification.

Fifth. Further, as regards the production of affinite alterations of the image of an original the principle is to be repeated that two optically-perspective systems of images which are to complete one another in an affinite manner must have in common the intermediate image, together with the corresponding counter-axis. In this connection it is not necessary that the axis of collineation of the two systems shall be the same—in fact, several of the attempts hitherto made to solve by constructional methods purely optical affinite systems of alterations of image represent cases in which this is not the case, Fig. 9; but in such cases the following should be taken into consideration: ($a$) Since the three planes—$i. e.$, of the original, its final image, and the intermediate image—do not intersect one another in the same straight line, the direction of the affinity rays is not determined by the straight line that connects the two centers of projection $o'$ and $o''$, Fig. 9. ($b$) The scale of the affinite determination alters and depends on the proportion between the distances of the axes of collineation $M'$ and $M''$, Fig. 9, of the two perspective systems from their common counter-axis $g^3$ on the intermediate image.

II. In the case of spherical mirrors—

First. Every plane image is reproduced as a plane image by any desired combination of spherical mirrors, so far as spherical aberration can be neglected.

Second. The two planes A and B and the vertex plane S of the mirror intersect one another in the same straight line M, which fills the function of the geometric axis of collineation of the two images.

Third. The general equation for a mirror (vertex equation) is as follows:

$$\pm \frac{1}{F} = \frac{1}{a} + \frac{1}{b}$$

or $$\pm \frac{1}{F} = \frac{1}{R \tan. e} + \frac{1}{R \tan. i}$$

if $R = M S$ and $F = \frac{r}{2}$ equals half the radius of curvature. $+\frac{1}{F}$ refers to concave mirrors.

$-\frac{1}{F}$ refers to convex mirrors.

Fourth. This vertex equation of spherical mirrors has, like the lens equation, an important signification, namely: If the counter-axes of the perspective system of images be determined by drawing planes through the center of curvature C of the mirror parallel to the two planes A and B and causing them to intersect the said two planes, then these counter-axes will always be situated in the focal plane of the mirror.

In carrying out the method of producing projective alterations of images the procedure is as follows: After being determined with the help of the laws and principles hereinbefore set forth by mathematical or by graphic calculation, the necessary data for adjusting the original, the objective, and the image then when telesystems are employed as the objective, the first plane A containing the original and the second plane B containing the dulled glass screen intended to receive the projected image, together with the corresponding (first or second) principal plane $H_I$ $H_{II}$ of the objective, are caused to intersect one another in such a manner that the two straight lines of intersection thereby produced will become optically conjugate straight lines in accordance with the laws of optics. In this manner the first condition for the clearness of definition of the image is fulfilled. Then one plane—say, for instance, the plane containing the dulled glass screen—is rotated relatively to the other plane, which in this case contains the original and which is kept stationary until it is parallel to the counter-plane, which appertains to the aforesaid stationary plane and which is determined by the latter and by the focal plane (appertaining to it) of the objective. In this manner the second condition for the clearness of definition of the image is fulfilled—namely, that the counter-axes shall lie in the focal planes. Then an image of the original having the desired degree of distortion and with perfect clearness of definition will appear on the dulled glass screen. When symmetrical systems of lenses are used as an objective in which the two principal planes thereof become the objective plane, the procedure is exactly the same, because the two planes that contain the original and the dulled glass screen are caused to intersect the objective plane in the same straight line and then one plane is rotated relatively to the other stationary plane until it is parallel to the counter-plane of the said stationary plane. When spherical mirrors are used, the foregoing also holds good as in symmetrical objectives, except that in the case of spherical mirrors the vertex plane of the mirror replaces the objective plane.

When affinite alterations of an image are to be produced, the procedure may be as follows: The devices mentioned hereinbefore are arranged two or even more in number, one behind the other, so that the result of the first device—namely, the intermediate image—is either first fixed by photography and then afterward altered, or it may be immediately further altered by the second device without being so fixed. The same applies also to the result of this second device and its alteration in using the third device, and so on.

Figs. 14 and 15 serve to explain more fully the first method of affinite alteration of an image. As shown in Fig. 14, the image plane Z of the intermediate image $a''$ $b''$ $c''$ or the dulled glass screen of the first picture is kept stationary at any desired angle $i$ relatively to the optical axis of the objective, and the carrier of the intermediate image is shifted parallel to the objective plane toward the axis of collineation M or away from the same, according as it is desired to produce a shortening or a lengthening of the proportions of the image. Then the plane of the original is adjusted in such a manner as to cause the two planes and the objective plane to intersect one another in a straight line and to bring the counter-axis $g'$ of the original within the focal plane. As soon as the image is clearly visible on the dulled glass screen the first picture is taken and fixed by photography. Then the negative thus obtained is placed in the apparatus in the place from which it was taken. If this negative were now projected back into the plane of the original without any further adjustments, the result will be an exact reproduction of the original; but if the negative be shifted without altering the angle of inclination $i$ to the objective plane (mirror plane) and without altering the distance from the latter, or if the objective (the mirror) be shifted in its plane without altering the position of the intermediate image, (negative,) then on projecting back affinite alterations of pictures can be produced in the most varied stages of alteration after having fulfilled the conditions required for the production of a clearly defined image by rotating the plane in which the original was originally situated and onto which the affinitely altered image is being projected back. This method presumes that the picture to be reproduced and the dulled glass screen may exchange places relatively to the objective. If this is not the case and if the negative must be fastened to the carrier of the original in order to carry out the second alteration, then the method undergoes a modification. The intermediate image (negative) $a''$ $b''$ $c''$ is then, as shown in Fig. 15, arranged by the side of the original in such a manner that the counter-axis $g'$ of the original which was determined at the first "taking," as the straight line of the intersection of the plane Z with the focal plane $F_{II}$ is now caused by the new adjustment to come within the focal plane $F_I$. The shifting of the parts parallelly to the objective plane and the exact adjustment are effected in the same manner as in the preceding case; but in the present case every alteration in the angle of inclination $i$ of the intermediate image relatively to the objective plane causes an alteration in the scale of the affinite alteration.

As above stated, the method for the production of complicated projective and affinite alterations of an image may also be carried out without taking a photograph of the intermediate image by immediate further alteration of the same, and the necessary adjustments may be effected by correspondingly inclining or rotating two or more optical systems. Direct affinite alterations of images may likewise be effected—for example, without taking a photograph of an intermediate image—by immediate further alteration of the latter by collimating two optical systems (two lenses, one lens, and one mirror, or two mirrors) with each other—that is to say, causing their focal planes to coincide with each other. Two such systems collimated with each other are unable to reproduce oblique pictures otherwise than as affinite pictures because the plane of the intermediate image can intersect the common focal plane of the two optical systems in a single straight line only—that is to say, in the common counter-axis—thus by itself fulfilling the condition for affinity. Fig. 16 illustrates the carrying out of this method with the use of two hollow mirrors S and S'. The original $a$ $b$ is set within the field of vision of the two mirrors at any desired angle to the focal plane. The mirror S by reflecting the light-rays from the original onto the mirror S' produces an imaginary or virtual intermediate image situated outside of the surface of the figure and which is transformed by the mirror S' into the affinitely altered image $a'$ $b'$.

The practical carrying out of the method of projective alteration of an image is considerably facilitated by the use of apparatus which automatically give a constant clearness of definition of image, because then instead of the preliminary calculations and constructions only the following simple rules need to be observed.

First. Rotation of the original serves to place the straight lines which are to remain parallel in the original as well as in the distorted image parallel to the axis of collineation—that is to say, it serves to place the axis of collineation of the original parallel to the axis of distortion of the apparatus and then by shifting the image to bring it into coincidence with the axis of distortion.

Second. Parallel straight lines in the original appear in the transformation as lines intersecting one other, and vice versa. The geometrical loci of the points of intersection are the counter-axes.

Third. The degree of the divergence or of the convergence of mutually-intersecting images of parallel straight lines of the original, and vice versa, is solely a function of the distance of the counter-axes of the respective images from the axis of collineation. If this distance is smaller, then the divergence will be greater. When the distance is greater, the divergence will be less.

Fourth. The distance between the images of straight lines, which are parallel to the axis of collineation, is in the transformation smaller or larger than in the original—that is to say, the transformation appears to be shortened or lengthened in comparison with the original when it is shifted nearer to or farther away from the axis of collineation than the original.

Fifth. A rectangle in the original appears in the image as a trapeze when it is symmetrical to the optical axis of the objective, and it appears as a trapezoid when it is unsymmetrical, and the angles of the trapezoid are the more dissimilar the greater the unsymmetry of the position of the trapezoid.

Sixth. The distance of the counter-axis of the transformation from the axis of collineation, which distance is the determining factor for the divergence or the convergence of the projective images of parallel straight lines in the original, is best regulated continuously by the rotating the plane containing the transformed image; but it may also be altered intermittently by changing the objective, because it is also dependent on the focal length of the objective.

I claim—

1. A method for the production of projective alterations of images consisting of arranging the plane containing the original and the first principal plane of the objective on the one hand, and the plane containing the image, and the second principal plane of the objective on the other hand as to intersect one another respectively in such a manner that the resulting two straight lines of intersection become optically conjugate straight lines according to the laws of optics, and then rotating the plane containing the original or the image relatively to the other plane containing the image or the original and which is kept stationary until it is parallel to the counter-plane which appertains to the said stationary plane and which is determined by the intersection-line of the latter, the focal plane of the objective and the corresponding node-point of the objective.

2. A method for the production of projective alterations of image consisting in causing the planes containing the original and the image to intersect the objective plane in the same straight line, and then rotating the plane containing the original or the image relatively to the other plane containing the image or the original and which is kept stationary until it is parallel to the counter-plane which appertains to the said stationary plane, and which is determined by the intersection-line of the latter, the focal plane of the objective and the optical center of the objective.

3. The hereinbefore-described method of producing projective alterations of an image which consists in causing the two planes containing the original and the image to intersect the vertex plane of the mirror in the same straight line, and then rotating the plane containing the original or the image relatively to the other plane containing the image or the original and which is kept stationary until it is parallel to the counter-plane which appertains to the said stationary plane and which is determined by the intersection-line of the latter, the focal plane of the mirror and the center of curvature of the mirror.

4. A method for the production of projective alterations of images consisting of arranging the plane containing the original and the first principal plane of the objective or mirror on the one hand, and the plane containing the image, and the second principal plane of the objective or mirror on the other hand as to intersect one another respectively in such a manner that the resulting two straight lines of intersection become optically conjugate straight lines according to the laws of optics, and then rotating the plane containing the original or the image relatively to the other plane containing the image or the original and which is kept stationary until it is parallel to the counter-plane which appertains to the said stationary plane and which is determined by the intersection-line of the latter, the focal plane of the objective or mirror and by the corresponding node-point of the objective or by the center of curvature of the mirror, and then successively repeating the foregoing steps.

5. A method for the production of projective alterations of images consisting of arranging the plane containing the original and the first principal plane of the objective or mirror on the one hand, and the plane containing the image, and the second principal plane of the objective or mirror on the other hand as to intersect one another respectively in such a manner that the resulting two straight lines of intersection become optically conjugate straight lines according to the laws of optics, and then rotating the plane containing the original or the image relatively to the other plane containing the image or the original and which is kept stationary until it is parallel to the counter-plane which appertains to the said stationary plane and which is determined by the intersection-line of the latter, the focal plane of the objective or mirror and by the corresponding node-point of the objective or by the center of curvature of the mirror, and then repeating the foregoing steps a plurality of times and so that two or more of the repetitions will be executed at the same time so that the result of the first operation is immediately ordered by the second operation without being fixed by photography.

6. A method for the production of projective alterations of image consisting of arranging the plane containing the original and the first principal plane of the objective or mirror on the one hand, and the plane containing the image, and the second principal plane of the objective or mirror on the other hand as to intersect one another respectively in such a manner that the resulting two straight lines of intersection become optically conjugate straight lines according to the laws of optics, and then rotating the plane containing the original or the image relatively to the other plane containing the image or the original and which is kept stationary until it is parallel to the counter-plane which appertains to the said stationary plane and which is determined by the intersection-line of the latter, the focal line of the objective or mirror and by the corresponding node-point of the objective or by the center of curvature of the mirror, and then repeating the foregoing steps a plurality of times and so that two or more of the repetitions will be executed at the same time, so that the result of the first operation is immediately ordered by the second operation without being fixed by photography, and regulating by a block setting the two or more operations which are executed at the same time.

7. A method for the production of projective alterations of images consisting of arranging the plane containing the original and the first principal plane of the objective or mirror on the one hand, and the plane containing the image, and the second principal plane of the objective or mirror on the other hand as to intersect one another respectively in such a manner that the resulting two straight lines of intersection become optically conjugate straight lines according to the laws of optics, and then rotating the plane containing the original or the image relatively to the other plane containing the image or the original and which is kept stationary until it is parallel to the counter-plane which appertains to the said stationary plane and which is determined by the intersection-line of the latter, the focal plane of the objective or mirror and by the corresponding node-point of the objective or center of curvature of the mirror, and then repeating the foregoing steps a plurality of times and so that two of the repetitions will be executed at the same time so that the result of the first operation is immediately ordered by the second operation without being fixed by photography, and regulating the two operations which are to be carried out at the same time by causing the focal plane of two optical systems to coincide with each other and adjusting the original to any desired angle to the common focal plane and reproducing the original by the double system obtained by the collimation of the two optical systems.

In testimony that I claim the foregoing as my invention I have signed my name in presence of two subscribing witnesses.

THEODOR SCHEIMPFLUG.

Witnesses:
 JOSEF RUBASCH,
 O. SWOBODA.